US012651775B2

(12) United States Patent
Su et al.

(10) Patent No.: US 12,651,775 B2
(45) Date of Patent: Jun. 9, 2026

(54) ELECTROLYTES FOR LITHIUM BATTERIES

(71) Applicant: UCHICAGO ARGONNE, LLC, Chicago, IL (US)

(72) Inventors: Chi Cheung Su, Westmont, IL (US); Khalil Amine, Oakbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 674 days.

(21) Appl. No.: 17/717,695

(22) Filed: Apr. 11, 2022

(65) Prior Publication Data

US 2023/0327208 A1 Oct. 12, 2023

(51) Int. Cl.

| | |
|---|---|
| ***H01M 10/0569*** | (2010.01) |
| ***H01M 10/052*** | (2010.01) |
| ***H01M 10/0565*** | (2010.01) |
| ***H01M 10/0568*** | (2010.01) |
| ***H01M 12/08*** | (2006.01) |

(52) U.S. Cl.

CPC ..... *H01M 10/0569* (2013.01); *H01M 10/052* (2013.01); *H01M 10/0565* (2013.01); *H01M 10/0568* (2013.01); *H01M 12/08* (2013.01); *H01M 2300/0034* (2013.01); *H01M 2300/0037* (2013.01); *H01M 2300/0085* (2013.01)

(58) Field of Classification Search

CPC ........... H01M 10/0569; H01M 10/052; H01M 10/0565; H01M 10/0568; H01M 12/08; H01M 2300/0034; H01M 2300/0037; H01M 2300/0085; Y02E 60/10

See application file for complete search history.

(56) References Cited

U.S. PATENT DOCUMENTS

| | | | | |
|---|---|---|---|---|
| 5,176,708 A | | 1/1993 | Frey et al. | |
| 6,566,015 B1 | | 5/2003 | Yamada et al. | |
| 7,790,312 B2 | | 9/2010 | Costello et al. | |
| 10,224,571 B2 | | 3/2019 | Yang et al. | |
| 10,347,943 B2 | | 7/2019 | Zhang et al. | |
| 10,707,530 B2 | | 7/2020 | Yang et al. | |
| 11,114,696 B2 | | 9/2021 | Yang et al. | |
| 2008/0102377 A1 | * | 5/2008 | Abe .................. | H01M 10/0567 429/188 |
| 2010/0047695 A1 | * | 2/2010 | Smart ............... | H01M 10/0569 429/307 |
| 2011/0206994 A1 | * | 8/2011 | Balsara ............. | H01M 10/0565 977/788 |
| 2012/0121989 A1 | * | 5/2012 | Roberts ................. | H01M 4/366 429/342 |
| 2019/0058219 A1 | * | 2/2019 | Yang ................. | H01M 10/0525 |

(Continued)

FOREIGN PATENT DOCUMENTS

| | | | |
|---|---|---|---|
| JP | 2001-210368 | * | 8/2001 |
| JP | 2019114419 | * | 7/2019 |

OTHER PUBLICATIONS

U.S. Appl. No. 17/588,740, filed Jan. 31, 2022.

*Primary Examiner* — Lisa S Park

(74) *Attorney, Agent, or Firm* — Foley & Lardner LLP

(57) ABSTRACT

A lithium ion battery includes a cathode including a cathode active material; an anode including silicon, a conductive carbon, lithium metal, or a combination of any two or more thereof; a separator; and an electrolyte including a lithium sulfonylimide salt, a dicarbonyl solvent, and a fluorinated ether solvent.

14 Claims, 7 Drawing Sheets

(56) References Cited

U.S. PATENT DOCUMENTS

| | | | | |
|---|---|---|---|---|
| 2019/0207261 | A1 | 7/2019 | Yang et al. | |
| 2019/0326639 | A1 | 10/2019 | Kinoshita et al. | |
| 2020/0328475 | A1 | 10/2020 | Hakari et al. | |
| 2022/0231323 | A1* | 7/2022 | Chung ................ | H01M 10/056 |

* cited by examiner

ELECTROLYTES FOR LITHIUM BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to lithium rechargeable batteries. More particularly the technology relates to the use of dicarbonyl solvents coupled with fluorinated ethers and lithium fluorosulfonylimide salt in an electrochemical cell having a metallic lithium anode.

SUMMARY

In one aspect, an electrochemical cell includes a cathode including a cathode active material; an anode including silicon, a conductive carbon, lithium metal, or a combination of any two or more thereof; a separator; and an electrolyte including a lithium sulfonylimide salt, a dicarbonyl solvent, and a fluorinated ether solvent. In some embodiments, the fluorinated ether may be a compound represented as Formula I or II:

(I)

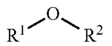

(II)

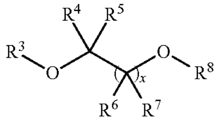

wherein: in Formula (I): $R^1$ and $R^2$ may be individually alkyl, $R^{20}$O-alkyl-, alkenyl, alkynyl, aryl, aralkyl, heteroaryl, heteroarylalkyl, heterocyclylalkyl, heterocyclylalkyl, cycloalkyl, cycloalkylalkyl; and $R^{20}$ is H, alkyl, cycloalkyl, cycloalkylalkyl, alkenyl, alkynyl, aryl, aralkyl, heterocyclyl, heterocyclylalkyl, heteroaryl, heteroarylalkyl, or siloxy; or where $R^1$ and $R^2$ may join together to form a cyclic compound incorporating an —O—$S(O)_2$—O— group; and with the proviso that at least one $R^1$ and $R^2$ is fluorinated; and in Formula (II): $R^3$, $R^4$, $R^5$, $R^6$, $R^7$, and $R^8$ may individually be H, alkyl, $R^{20}$O-alkyl-, alkenyl, alkynyl, aryl, aralkyl, heteroaryl, heteroarylalkyl, heterocyclylalkyl, heterocyclylalkyl, cycloalkyl, cycloalkylalkyl, or silyl; and $R^{20}$ is H, alkyl, cycloalkyl, cycloalkylalkyl, alkenyl, alkynyl, aryl, aralkyl, heterocyclyl, heterocyclylalkyl, heteroaryl, heteroarylalkyl, or siloxy; or where two of $R^3$, $R^4$, $R^5$, $R^6$, $R^7$, and $R^8$ may join together to form a cyclic compound incorporating an —O—$S(O)_2$—O— group; with the proviso that at least one $R^3$ and $R^8$ is fluorinated. In some embodiments, $R^1$ and $R^2$ may be non-fluorinated alkyl or fluorinated alkyl; $R^3$ and $R^8$ may be non-fluorinated alkyl or fluorinated alkyl; $R^4$, $R^5$, $R^6$, and $R^7$ may be individually H, nonfluorinated alkyl, or fluorinated alkyl; and x may be 0, 1, 2, 3, or 4; with the provisos that at least one of $R^1$ or $R^2$ is fluorinated alkyl; and at least one of $R^3$ and $R^8$ is fluorinated alkyl. In any such embodiments, the dicarbonyl solvent may be represented as Formula (III) or (IV):

(III)

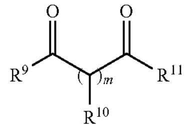

(IV)

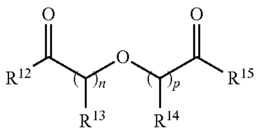

wherein: m, n, and p may be individually 0, 1, 2, or 3; $R^9$, $R^{11}$, $R^{12}$, $R^{13}$, $R^{14}$, and $R^{15}$ may be individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —$CFH_2$, —$CF_2H$, —$CF_3$, —$CF_2CF_3$, —$CF_2CHF_2$, —$CF_2CH_3$, —$CF_2CH_2F$, —$CHFCF_3$, —$CHFCHF_2$, —$CHFCH_3$, —$CHFCH_2F$, —$CH_2CF_3$, —$CH_2CHF_2$, —$CH_2CH_2F$, —$CF(CF_3)_2$, or —$CH(CF_3)_2$.

In another aspect, a lithium secondary battery may be the electrochemical cell as described herein. The electrochemical cells or lithium secondary batteries may be operated at a voltage of 4.2 V or greater. For example, from 4.2 V to 7 V, from 4.2 to 6 V, from 4.2 V to 5 V, from 4.4 V to 7 V, from 4.4 to 6 V, from 4.4 V to 5 V.

DETAILED DESCRIPTION

Figure 1:
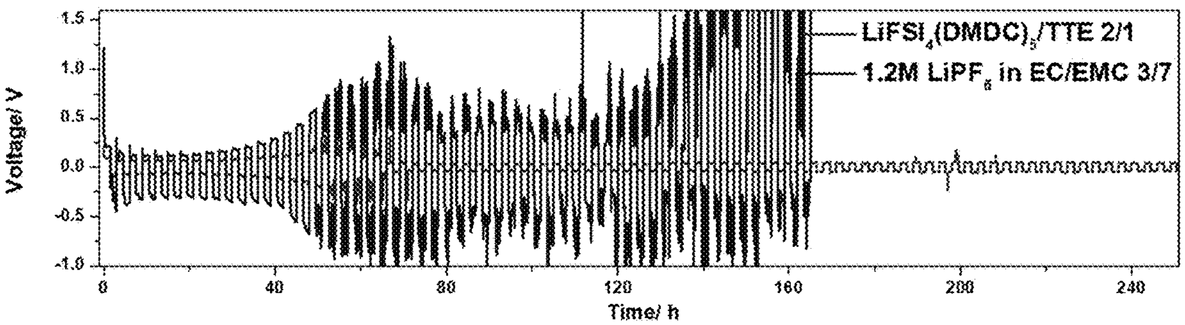
FIG. 1 is a graph of cycling performance of Li||Li symmetric cells using baseline $LiPF_6$ based electrolyte and dicarbonyl electrolyte, according to Example 2.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As utilized herein with respect to numerical ranges, the terms “approximately,” “about,” “substantially,” and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein a "non-fluorinated alkyl" may be unsubstituted or substituted with any of the above substituents for alkyl, except fluorine. Similarly, a "fluorinated alkyl" may be substituted with any of the above substituents or otherwise unsubstituted, however it must have at least one fluorine.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH—CH{=}CH_2$, $C{=}CH_2$, or $C{=}CHCH_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

It has now been found that for high voltage batteries, a lithium ion cell having an electrolyte that includes a lithium fluorosulfonylimide salt exhibits enhanced stability during cycling when the solvent include a dicarbonyl with a fluorinated ether. Fluorinated ethers are poor solvents for lithium salts in lithium ion battery electrolytes. However, they do provide stability to the system when used in conjunction with dicarbonyl solvents that are good solvents for the lithium salts. Further, non-fluorinated ethers degrade at higher voltages (i.e. <4.2 V vs. $Li/Li^+$). However, fluorinated ethers are stable at higher voltages and by using them with highly solvating dicarbonyl compounds can provide for high cycling stability. As shown below, this combination provides for a synergistic effect that is simply not predicted by the materials alone or in other combinations. In some embodiments, a ratio of dicarbonyl to fluorinated ether ratio from 4:1 to 1:4 volume ratio.

In one aspect, an electrochemical cell is provided having a cathode comprising a cathode active material; an anode comprising silicon, a conductive carbon, lithium metal, or a combination of any two or more thereof; a separator; and an electrolyte that includes a lithium fluorosulfonylimide salt in a solvent system comprising a dicarbonyl solvent and a fluorinated ether. The conductive carbon may be a material such as, but not limited to, carbon nanotubes, carbon fiber, microporous carbon, mesoporous carbon, macroporous carbon, mesoporous microbeads, graphene, reduced graphene oxide, graphite, expandable graphite, polymer yield carbon (such as polyacrylonitrile), Super P, Black Pearl 2000, Denka Black, Vulcan XC72R, Ketjen black, or combination of any two or more thereof. Where the anode includes lithium, the lithium may be intercalated into the silicon or conductive carbon, or a metal, such as a metal foil.

In such cells, illustrative fluorinated ethers may be those as represented as Formula I or II:

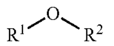
(I)

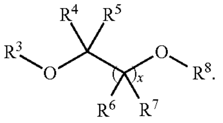
(II)

In Formula I, $R^1$ and $R^2$ may be individually alkyl, $R^{20}$O-alkyl-, alkenyl, alkynyl, aryl, aralkyl, heteroaryl, heteroarylalkyl, heterocyclylalkyl, heterocyclylalkyl, cycloalkyl, cycloalkylalkyl; and $R^{20}$ is H, alkyl, cycloalkyl, cycloalkylalkyl, alkenyl, alkynyl, aryl, aralkyl, heterocyclyl, heterocyclylalkyl, heteroaryl, heteroarylalkyl, or siloxy; or where $R^1$ and $R^2$ may join together to form a cyclic compound incorporating an —O—$S(O)_2$—O— group, with the proviso that at least one $R^1$ and $R^2$ is fluorinated. In any of the above embodiments, $R^1$ may be $C_1$-$C_{12}$ alkyl, $C_1$-$C_{12}$ alkenyl, $C_1$-$C_{12}$ alkynyl, $C_7$-$C_{17}$ aralkyl, $C_7$-$C_{17}$ heteroarylalkyl, $C_7$-$C_{17}$ heterocyclylalkyl, $C_7$-$C_{17}$ cycloalkylalkyl, or silyl, and $R^2$ may be $C_1$-$C_{12}$ alkyl, $C_1$-$C_{12}$ alkenyl, $C_1$-$C_{12}$ alkynyl, $C_7$-$C_{17}$ aralkyl, $C_7$-$C_{17}$ heteroarylalkyl, $C_7$-$C_{17}$ heterocyclylalkyl, $C_7$-$C_{17}$ cycloalkylalkyl, or silyl.

In any of the above embodiments, one or both of $R^1$ and $R^2$ may be -alkylOR$^{20}$, wherein $R^{20}$ is H, alkyl, alkenyl, alkynyl, aryl, heteroaryl, heterocyclyl, cycloalkyl, aralkyl, heteroarylalkyl, heterocyclylalkyl, or cycloalkylalkyl. In some embodiments, $R^{20}$ is H, $C_1$-$C_{12}$ alkyl, $C_1$-$C_{12}$ alkenyl, $C_1$-$C_{12}$ alkynyl, $C_7$-$C_{17}$ aralkyl, $C_7$-$C_{17}$ heteroarylalkyl, $C_7$-$C_{17}$ heterocyclylalkyl, or $C_7$-$C_{17}$ cycloalkylalkyl.

In any of the above embodiments, at least one of $R^1$ and $R^2$ may be —$CFH_2$; —$CF_2H$; —$CF_3$; —$CF_2CF_3$; —$CF_2CHF_2$; —$CF_2CH_3$; —$CF_2CH_2F$; —$CHFCF_3$; —$CHFCHF_2$; —$CHFCH_3$; —$CHFCH_2F$; —$CH_2CF_3$; —$CH_2CHF_2$; —$CH_2CH_2F$; —$CF(CF_3)_2$; —$CH(CF_3)_2$; —$CF_2CF_2CF_3$; —$CF_2CF_2CHF_2$; —$CF_2CF_2CH_3$; —$CF_2CF_2CH_2F$; —$CH_2CF_2CF_3$; —$CH_2CF_2CHF_2$; —$CH_2CF_2CH_3$; —$CH_2CF_2CH_2F$; —$CHFCF_2CF_3$; —$CHFCF_2CHF_2$; —$CHFCF_2CH_3$; —$CHFCF_2CH_2F$; —$CF_2CH_2CF_3$; —$CF_2CH_2CHF_2$; —$CF_2CH_2CH_3$; —$CF_2CH_2CH_2F$; —$CF_2CHFCF_3$; —$CF_2CHFCHF_2$; —$CF_2CHFCH_3$; —$CF_2CHFCH_2F$; —$CHFCHFCF_3$; —$CHFCHFCHF_2$; —$CHFCHFCH_3$; —$CHFCHFCH_2F$; $CH_2CH_2CF_3$; —$CH_2CH_2CHF_2$; —$CH_2CH_2CH_2F$; —$CF_2CF_2CF_2CF_3$; —$CF_2CF_2CF_2CH_3$; —$CF_2CF_2CF_2CHF_2$; —$CF_2CF_2CF_2CH_2F$; —$CH_2CF_2CF_2CF_3$; —$CH_2CF_2CF_2CH_3$; —$CH_2CF_2CF_2CHF_2$; —$CH_2CF_2CF_2CH_2F$; —$CHFCF_2CF_2CF_3$; —$CHFCF_2CF_2CH_3$; —$CHFCF_2CF_2CHF_2$; —$CHFCF_2CF_2CH_2F$; —$CF_2CH_2CF_2CF_3$; —$CF_2CH_2CF_2CH_3$; —$CF_2CH_2CF_2CHF_2$; —$CF_2CH_2CF_2CH_2F$; —$CF_2CHFCF_2CF_3$; —$CF_2CHFCF_2CH_3$; —$CF_2CHFCF_2CHF_2$; —$CF_2CHFCF_2CH_2F$; —$CHFCHFCF_2CF_3$; —$CHFCHFCF_2CH_3$; —$CHFCHFCF_2CHF_2$; —$CHFCHFCF_2CH_2F$; —$CH_2CH_2CF_2CF_3$; —$CH_2CH_2CF_2CH_3$; —$CH_2CH_2CF_2CHF_2$; —$CH_2CH_2CF_2CH_2F$; —$CF_2CF_2CF_2CF_2CF_3$; —$CH_2CF_2CF_2CF_2CF_3$; —$CF_2CF_2CF_2CF_2CHF_2$; —$CH_2CF_2CF_2CF_2CHF_2$; —$CF_2OCFH_2$; —$CF_2OCF_2H$; —$CF_2OCF_3$; —$CF_2OCF_2CF_3$; —$CF_2OCF_2CHF_2$; —$CF_2OCF_2CH_3$; —$CF_2OCF_2CH_2F$; —$CF_2OCHFCF_3$; —$CF_2OCHFCHF_2$; —$CF_2OCHFCH_3$; —$CF_2OCHFCH_2F$; —$CF_2OCH_2CF_3$; —$CF_2OCH_2CHF_2$; —$CF_2OCH_2CH_2F$; —$CH_2OCFH_2$; —$CH_2OCF_2H$; —$CH_2OCF_3$; —$CH_2OCF_2CF_3$; —$CH_2OCF_2CHF_2$; —$CH_2OCF_2CH_3$; —$CH_2OCF_2CH_2F$; —$CH_2OCHFCF_3$; —$CH_2OCHFCHF_2$; —$CH_2OCHFCH_3$; —$CH_2OCHFCH_2F$; —$CH_2OCH_2CF_3$; —$CH_2OCH_2CHF_2$; —$CH_2OCH_2CH_2F$; —$CHFOCFH_2$; —$CHFOCF_2H$; —$CHFOCF_3$; —$CHFOCF_2CF_3$; —$CHFOCF_2CHF_2$; —$CHFOCF_2CH_3$; —$CHFOCF_2CH_2F$; —$CHFOCHFCF_3$; —$CHFOCHFCHF_2$; —$CHFOCHFCH_3$; —$CHFOCHFCH_2F$; —$CHFOCH_2CF_3$; —$CHFOCH_2CHF_2$; or —$CHFOCH_2CH_2F$.

In Formula II, $R^3$, $R^4$, $R^5$, $R^6$, $R^7$, and $R^8$ may individually be H, alkyl, alkenyl, alkynyl, aryl, aralkyl, heteroaryl, heteroarylalkyl, heterocyclylalkyl, heterocyclylalkyl, cycloalkyl, cycloalkylalkyl, or silyl; $R^{20}$ is H, alkyl, cycloalkyl, cycloalkylalkyl, alkenyl, alkynyl, aryl, aralkyl, heterocyclyl, heterocyclylalkyl, heteroaryl, heteroarylalkyl, or siloxy; or where two of $R^3$, $R^4$, $R^5$, $R^6$, $R^7$, and $R^8$ may join together to form a cyclic compound incorporating an —O—$S(O)_2$—O— group, with the proviso that at least one $R^3$ and $R^8$ is fluorinated. In any of the above embodiments, $R^3$ and $R^8$ may individually be $C_1$-$C_{12}$ alkyl, $C_1$-$C_{12}$ alkenyl, $C_1$-$C_{12}$alkynyl, $C_7$-$C_{17}$ aralkyl, $C_7$-$C_{17}$ heteroarylalkyl, $C_7$-$C_{17}$ heterocyclylalkyl, $C_7$-$C_{17}$ cycloalkylalkyl, or silyl.

In any of the above embodiments, $R^3$, $R^4$, $R^5$, $R^6$, $R^7$, and $R^8$ may individually be -alkylOR$^{20}$, wherein $R^{20}$H, $C_1$-$C_{12}$ alkyl, $C_1$-$C_{12}$ alkenyl, $C_1$-$C_{12}$ alkynyl, $C_7$-$C_{17}$ aralkyl, $C_7$-$C_{17}$ heteroarylalkyl, $C_7$-$C_{17}$ heterocyclylalkyl, or $C_7$-$C_{17}$ cycloalkylalkyl.

In any of the above embodiments, $R^3$, $R^4$, $R^5$, $R^6$, $R^7$, and $R^8$, or at least one of $R^3$ and $R^8$ may individually be —$CFH_2$; —$CF_2H$; —$CF_3$; —$CF_2CF_3$; —$CF_2CHF_2$; —$CF_2CH_3$; —$CF_2CH_2F$; —$CHFCF_3$; —$CHFCHF_2$; —$CHFCH_3$; —$CHFCH_2F$; —$CH_2CF_3$; —$CH_2CHF_2$; —$CH_2CH_2F$; —$CF(CF_3)_2$; —$CH(CF_3)_2$; —$CF_2CF_2CF_3$; —$CF_2CF_2CHF_2$; —$CF_2CF_2CH_3$; —$CF_2CF_2CH_2F$; —$CH_2CF_2CF_3$; —$CH_2CF_2CHF_2$; —$CH_2CF_2CH_3$; —$CH_2CF_2CH_2F$; —$CHFCF_2CF_3$; —$CHFCF_2CHF$ 2; —$CHFCF_2CH_3$; —$CHFCF_2CH_2F$; —$CF_2CH_2CF_3$; —$CF_2CH_2CHF$ 2; —$CF_2CH_2CH_3$; —$CF_2CH_2CH_2F$; —$CF_2CHFCF_3$; —$CF_2CHFCHF_2$; —$CF_2CHFCH_3$; —$CF_2CHFCH_2F$; —$CHFCHFCF_3$; —$CHFCHFCHF_2$;

—$CHFCHFCH_3$; —$CHFCHFCH_2F$; $CH_2CH_2CF_3$; —$CH_2CH_2CHF_2$; —$CH_2CH_2CH_2F$; —$CF_2CF_2CF_2CF_3$; —$CF_2CF_2CF_2CH_3$; —$CF_2CF_2CF_2CHF_2$; —$CF_2CF_2CF_2CH_2F$; —$CH_2CF_2CF_2CF_3$; —$CH_2CF_2CF_2CH_3$; —$CH_2CF_2CF_2CHF_2$; —$CH_2CF_2CF_2CH_2F$; —$CHFCF_2CF_2CF_3$; —$CHFCF_2CF_2CH_3$; —$CHFCF_2CF_2CHF_2$; —$CHFCF_2CF_2CH_2F$; —$CF_2CH_2CF_2CF_3$; —$CF_2CH_2CF_2CH_3$; —$CF_2CH_2CF_2CHF_2$; —$CF_2CH_2CF_2CH_2F$; —$CF_2CHFCF_2CF_3$; —$CF_2CHFCF_2CH_3$; —$CF_2CHFCF_2CHF_2$; —$CF_2CHFCF_2CH_2F$; —$CHFCHFCF_2CF_3$; —$CHFCHFCF_2CH_3$; —$CHFCHFCF_2CHF_2$; —$CHFCHFCF_2CH_2F$; —$CH_2CH_2CF_2CF_3$; —$CH_2CH_2CF_2CH_3$; —$CH_2CH_2CF_2CHF_2$; —$CH_2CH_2CF_2CH_2F$; —$CF_2CF_2CF_2CF_2CF_3$; —$CH_2CF_2CF_2CF_2CF_3$; —$CF_2CF_2CF_2CF_2CHF_2$; —$CH_2CF_2CF_2CF_2CHF_2$; —$CF_2OCFH_2$, —$CF_2OCF_2H$; —$CF_2OCF_3$; —$CF_2OCF_2CF_3$; —$CF_2OCF_2CHF_2$; —$CF_2OCF_2CH_3$; —$CF_2OCF_2CH_2F$; —$CF_2OCHFCF_3$; —$CF_2OCHFCHF_2$; —$CF_2OCHFCH_3$; —$CF_2OCHFCH_2F$; —$CF_2OCH_2CF_3$; —$CF_2OCH_2CHF_2$; —$CF_2OCH_2CH_2F$; —$CH_2OCFH_2$; —$CH_2OCF_2H$; —$CH_2OCF_3$; —$CH_2OCF_2CF_3$; —$CH_2OCF_2CHF_2$; —$CH_2OCF_2CH_3$; —$CH_2OCF_2CH_2F$; —$CH_2OCHFCF_3$; —$CH_2OCHFCHF_2$; —$CH_2OCHFCH_3$; —$CH_2OCHFCH_2F$; —$CH_2OCH_2CF_3$; —$CH_2OCH_2CHF_2$; —$CH_2OCH_2CH_2F$; —$CHFOCFH_2$; —$CHFOCF_2H$; —$CHFOCF_3$; —$CHFOCF_2CF_3$; —$CHFOCF_2CHF_2$; —$CHFOCF_2CH_3$; —$CHFOCF_2CH_2F$; —$CHFOCHFCF_3$; —$CHFOCHFCHF_2$; —$CHFOCHFCH_3$; —$CHFOCHFCH_2F$; —$CHFOCH_2CF_3$; —$CHFOCH_2CHF_2$; or —$CHFOCH_2CH_2F$.

In some embodiments, in Formula I, $R^1$ and $R^2$ may be non-fluorinated alkyl or fluorinated alkyl, however at least one is fluorinated (i.e. the alkyl includes at least one F atom). In other words, $R^1$ may be non-fluorinated alkyl or fluorinated alkyl, while $R^2$ is fluorinated alkyl. In Formula II, and similar to $R^1$ and $R^2$ above as the terminal groups, $R^3$ and $R^8$ may non-fluorinated alkyl or fluorinated alkyl, however at least one is fluorinated. Also in Formula II $R^4$, $R^5$, $R^6$, and $R^7$ may be individually H, non-fluorinated alkyl, or fluorinated alkyl and x is 0, 1, 2, 3, or 4. In any of the above embodiments, the non-fluorinated alkyl may be a $C_1$-$C_8$ non-fluorinated alkyl and the fluorinated alkyl may be a $C_1$-$C_8$ fluorinated alkyl.

In the above compounds, the fluorinated alkyl groups may be illustrated as —$CFH_2$; —$CF_2H$; —$CF_3$; —$CF_2CF_3$; —$CF_2CHF_2$; —$CF_2CH_3$; —$CF_2CH_2F$; —$CHFCF_3$; —$CHFCHF_2$; —$CHFCH_3$; —$CHFCH_2F$; —$CH_2CF_3$; —$CH_2CHF_2$; —$CH_2CH_2F$; —$CF(CF_3)_2$; —$CH(CF_3)_2$; —$CF_2CF_2CF_3$; —$CF_2CF_2CHF_2$; —$CF_2CF_2CH_3$; —$CF_2CF_2CH_2F$; —$CH_2CF_2CF_3$; —$CH_2CF_2CHF_2$; —$CH_2CF_2CH_3$; —$CH_2CF_2CH_2F$; —$CHFCF_2CF_3$; —$CHFCF_2CHF_2$; —$CHFCF_2CH_3$; —$CHFCF_2CH_2F$; —$CF_2CH_2CF_3$; —$CF_2CH_2CHF_2$; —$CF_2CH_2CH_3$; —$CF_2CH_2CH_2F$; —$CF_2CHFCF_3$; —$CF_2CHFCHF_2$; —$CF_2CHFCH_3$; —$CF_2CHFCH_2F$; —$CHFCHFCF_3$; —$CHFCHFCHF_2$; —$CHFCHFCH_3$; —$CHFCHFCH_2F$; $CH_2CH_2CF_3$; —$CH_2CH_2CHF_2$; —$CH_2CH_2CH_2F$; —$CF_2CF_2CF_2CF_3$; —$CF_2CF_2CF_2CH_3$; —$CF_2CF_2CF_2CHF_2$; —$CF_2CF_2CF_2CH_2F$; —$CH_2CF_2CF_2CF_3$; —$CH_2CF_2CF_2CH_3$; —$CH_2CF_2CF_2CHF_2$; —$CH_2CF_2CF_2CH_2F$; —$CHFCF_2CF_2CF_3$; —$CHFCF_2CF_2CH_3$; —$CHFCF_2CF_2CHF_2$; —$CHFCF_2CF_2CH_2F$; —$CF_2CH_2CF_2CF_3$; —$CF_2CH_2CF_2CH_3$; —$CF_2CH_2CF_2CHF_2$; —$CF_2CH_2CF_2CH_2F$; —$CF_2CHFCF_2CF_3$; —$CF_2CHFCF_2CH_3$; —$CF_2CHFCF_2CHF_2$; —$CF_2CHFCF_2CH_2F$; —$CHFCHFCF_2CF_3$; —$CHFCHFCF_2CH_3$; —$CHFCHFCF_2CHF_2$; —$CHFCHFCF_2CH_2F$; —$CH_2CH_2CF_2CF_3$; —$CH_2CH_2CF_2CH_3$; —$CH_2CH_2CF_2CHF_2$; —$CH_2CH_2CF_2CH_2F$; —$CF_2CF_2CF_2CF_2CF_3$; —$CH_2CF_2CF_2CF_2CF_3$; —$CF_2CF_2CF_2CF_2CHF_2$; —$CH_2CF_2CF_2CF_2CHF_2$; —$CF_2OCFH_2$; —$CF_2OCF_2H$; —$CF_2OCF_3$; —$CF_2OCF_2CF_3$; —$CF_2OCF_2CHF_2$; —$CF_2OCF_2CH_3$; —$CF_2OCF_2CH_2F$; —$CF_2OCHFCF_3$; —$CF_2OCHFCHF_2$; —$CF_2OCHFCH_3$; —$CF_2OCHFCH_2F$; —$CF_2OCH_2CF_3$; —$CF_2OCH_2CHF_2$; —$CF_2OCH_2CH_2F$; —$CH_2OCFH_2$; —$CH_2OCF_2H$; —$CH_2OCF_3$; —$CH_2OCF_2CF_3$; —$CH_2OCF_2CHF_2$; —$CH_2OCF_2CH_3$; —$CH_2OCF_2CH_2F$; —$CH_2OCHFCF_3$; —$CH_2OCHFCHF_2$; —$CH_2OCHFCH_3$; —$CH_2OCHFCH_2F$; —$CH_2OCH_2CF_3$; —$CH_2OCH_2CHF_2$; —$CH_2OCH_2CH_2F$; —$CHFOCFH_2$; —$CHFOCF_2H$; —$CHFOCF_3$; —$CHFOCF_2CF_3$; —$CHFOCF_2CHF_2$; —$CHFOCF_2CH_3$; —$CHFOCF_2CH_2F$; —$CHFOCHFCF_3$; —$CHFOCHFCHF_2$; —$CHFOCHFCH_3$; —$CHFOCHFCH_2F$; —$CHFOCH_2CF_3$; —$CHFOCH_2CHF_2$; or —$CHFOCH_2CH_2F$.

In one embodiment, the fluorinated ether may be 1,1,2,2-tetrafluoro-3-(1,1,2,2-tetrafluoroethoxy)propane; 2,2,3,3-tetrafluoro-1,4-dimethoxybutane; bis(2,2,2-trifluoroethyl) ether; 1,1,2,2-tetrafluoroethyl-2,2,2-trifluoroethyl ether; 1,1,2,3,3,3-hexafluoropropyl 2,2,2-trifluoroethyl ether; 1,1,2,2-tetrafluoroethyl-1H,1H,5H-octafluoropentyl ether; 1,2-(1,1,2,2-tetrafluoroethoxy)ethane; 1,3-(1,1,2,2-tetrafluoroethoxy)propane, or a mixture of any two or more thereof.

In the electrolyte, the dicarbonyl solvent may be represented by Formula (III) or (IV):

(III)

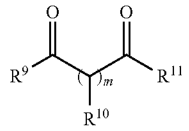

(IV)

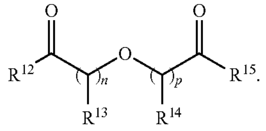

In the formulae, m, n, and p are individually 0, 1, 2, or 3; and $R^9$, $R^{11}$, $R^{12}$, $R^{13}$, $R^{14}$, and $R^{15}$ are individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, or siloxy. For example, they may be illustrated as an ether, a polyalkylene glycol, —$CFH_2$, —$CF_2H$, —$CF_3$, —$CF_2CF_3$, —$CF_2CHF_2$, —$CF_2CH_3$, —$CF_2CH_2F$, —$CHFCF_3$, —$CHFCHF_2$, —$CHFCH_3$, —$CHFCH_2F$, —$CH_2CF_3$, —$CH_2CHF_2$, —$CH_2CH_2F$, —$CF(CF_3)_2$, or —$CH(CF_3)_2$. In some embodiments, the dicarbonyl compound may be dimethyldicarbonate; diethyl dicarbonate; acetylacetone; ethyl acetoacetate; di-tert-butyl dicarbonate; 3,3-dimethyl-2,4-pentanedione; 2,2,6,6-tetramethyl-3,5-heptanedione; 1,1,1-trifluoro-2,4-pentanedione; dimethyl malonate; di-tert-butyl malonate; diethyl malonate; diethyl oxalate.

To form a highly stable solid-electrolyte interphase (SEI) on the lithium anode, a lithium sulfonylimide salt may be included in the electrolyte. Illustrative lithium sulfonylimide salts include, but are not limited to, $LiN(SO_2F)_2$; $LiN(SO_2CF_3)_2$; $LiN(SO_2C_2F_5)_2$; $Li(SO_2F)N(SO_2CF_3)$; $Li(SO_2F)N(SO_2CH_3)$; $Li(SO_2F)N(SO_2C_2H_5)$; $Li(SO_2F)N(SO_2C_2F_5)$; $Li(SO_2F)N(SO_2CHF_2)$; $Li(SO_2F)N(SO_2CH_2F)$; $Li(SO_2F)N(SO_2CH_2CF_3)$; $Li(SO_2F)N(SO_2CH_2CHF_2)$; $Li(SO_2F)N(SO_2CHFCH_3)$; $Li(SO_2F)N(SO_2CHFCF_3)$; $Li(SO_2F)N(SO_2CHFCHF_2)$; $Li(SO_2F)N(SO_2CHFCH_2F)$; $Li(SO_2F)N(SO_2CF_2CH_3)$; $Li(SO_2F)N(SO_2CF_2CF_3)$; $Li(SO_2F)N(SO_2CF_2CHF_2)$; $Li(SO_2F)N(SO_2CF_2CH_2F)$; $Li(SO_2CF_3)N(SO_2CH_3)$; $Li(SO_2CF_3)N(SO_2CHF_2)$; $Li(SO_2CF_3)N(SO_2CH_2F)$; $Li(SO_2CF_3)N(SO_2CH_2CF_3)$, or mixtures of any two or more thereof. The salt may be present in the electrolyte at a concentration from about 0.5M to 5M.

In addition, the electrolyte may include other stabilizing additives. For example, illustrative stabilizing additives include, but are not limited to, $LiBF_2(C_2O_4)$, $LiB(C_2O_4)_2$, $LiPF_2(C_2O_4)_2$, $LiPF_4(C_2O_4)'$ $LiPF_6$, $LiAsF_6$, CsF, $CsPF_6$, $LiN(SO_2CF_3)_2$, $LiN(SO_2F)_2$, $Li_2(B_{12}X_{12-i}H_i)$; $Li_2(B_{10}X_{10-i'}H_{i'})$; or a mixture of any two or more thereof, where X is independently at each occurrence a halogen, i is an integer from 0 to 12 and i' is an integer from 0 to 10. The electrolyte may also include an aprotic gel polymer. For example, mixtures of poly(ethylene oxide) (PEO) with lithium salts and an organic aprotic solvent may be used.

In some embodiments, the electrolyte may also contain an electrode stabilizing additive such as but is not limited to $LiB(C_2O_4)_2$, $LiBF_2(C_2O_4)_2$, vinylene carbonate, vinyl ethylene carbonate, propargylmethyl carbonate, 1,3,2-dioxathiolane-2,2-dioxide, ethylene sulfite, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydroorooyran, 3,9-diethylidene-2,4,8-trioxaspiro[5,5]undecane, 2-ethylidene-5-vinyl-[1,3]dioxane, anisoles, 2,5-dimethyl-1,4-dimethoxybenzene, 2,3,5,6-tetramethyl-1,4-dimethoxybenzene, 2,5-di-tert-butyl-1,4-dimethoxybenzene, or a mixture of two or more thereof. However, where the electrode stabilizing additive contains lithium, and when used, it is not the same as the lithium sulfonylimide salt.

In some embodiments, the electrolyte may also include a redox shuttle material. The shuttle, if present, will have an electrochemical potential above the positive electrode's maximum normal operating potential. Illustrative stabilizing agents include, but are not limited to, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydroorooyran, 3,9-diethylidene-2,4,8-trioxaspiro[5,5]undecane, 2-ethylidene-5-vinyl-[1,3]dioxane, lithium alkyl fluorophosphates, lithium alkyl fluoroborates, lithium 4,5-dicyano-2-(trifluoromethyl)imidazole, lithium 4,5-dicyano-2-methylimidazole, trilithium 2,2',2''-tris(trifluoromethyl) benzotris(imidazolate), $Li(CF_3CO_2)$, $Li(C_2F_5CO_2)$, $LiCF_3SO_3$, $LiCH_3SO_3$, $LiN(SO_2CF_3)_2$, $LiC(CF_3SO_2)_3$, $LiN(SO_2C_2F_5)_2$, $LiClO_4$, $LiAsF_6$, $Li_2(B_{12}X_{12-i}\ H_i)$, $Li_2(B_{10}X_{10-I'}H_{I'})$, wherein X is independently at each occurrence a halogen, I is an integer from 0 to 12 and I' is an integer from 0 to 10, 1,3,2-dioxathiolane 2,2-dioxide, 4-methyl-1,3,2-dioxathiolane 2,2-dioxide, 4-(trifluoromethyl)-1,3,2-dioxathiolane 2,2-dioxide, 4-fluoro-1,3,2-dioxathiolane 2,2-dioxide, 4,5-difluoro-1,3,2-dioxathiolane 2,2-dioxide, dimethyl sulfate, methyl (2,2,2-trifluoroethyl) sulfate, methyl (trifluoromethyl) sulfate, bis(trifluoromethyl) sulfate, 1,2-oxathiolane 2,2-dioxide, methyl ethanesulfonate, 5-fluoro-1,2-oxathiolane 2,2-dioxide, 5-(trifluoromethyl)-1,2-oxathiolane 2,2-dioxide, 4-fluoro-1,2-oxathiolane 2,2-dioxide, 4-(trifluoromethyl)-1,2-oxathiolane 2,2-dioxide, 3-fluoro-1,2-oxathiolane 2,2-dioxide, 3-(trifluoromethyl)-1,2-oxathiolane 2,2-dioxide, difluoro-1,2-oxathiolane 2,2-dioxide, 5H-1,2-oxathiole 2,2-dioxide, 2,5-dimethyl-1,4-dimethoxybenzene, 2,3,5,6-tetramethyl-1,4-dimethoxybenzene, 2,5-di-tert-butyl-1,4-dimethoxybenzene or a mixture of any two or more thereof, with the proviso that when used, the redox shuttle is not the same as the lithium salt, even though they perform the same function in the cell. That is, for example, if the lithium salt is $LiClO_4$, it may also perform the dual function of being a redox shuttle, however if a redox shuttle is included in that same cell, it will be a different material than $LiClO_4$.

Illustrative cathode active materials include, but are not limited to, a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1+x'}Ni_hMn_kCo_lMe^2_{y'}O_{2-z'}F_{z'}$, $VO_2$ or $E_{x''}F_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0\leq x\leq 0.3$; $0\leq y\leq 0.5$; $0\leq z\leq 0.5$; $0\leq m\leq 2$; $0\leq n\leq 2$; $0\leq x'\leq 0.4$; $0\leq\alpha\leq 1$; $0\leq\beta\leq 1$; $0\leq\gamma\leq 1$; $0\leq h\leq 1$; $0\leq k\leq 1$; $0\leq l\leq 1$; $0\leq y'\leq 0.4$; $0\leq z'\leq 0.4$; and $0\leq x''\leq 3$; with the proviso that at least one of h, k and 1 is greater than 0. In some embodiments, the salt is present in the solvent from about 0.3 M to about 3 M.

In some embodiments, the cathode active material includes $Li_{1+w}Mn_xNi_yCo_zO_2$ wherein w, x, y, and z satisfy the relations $0<w<1$, $0\leq x<1$, $0\leq y<1$, $0\leq z<1$, and $x+y+z=1$. In some embodiments, the cathode active material includes $LiMn_xNi_yO_4$ wherein x and y satisfy the $0\leq x<2$, $0\leq y<2$, and $x+y=2$. In some embodiments, the positive electrode includes $LiMn_xNi_yO_4$ wherein x and y satisfy the $0\leq x<2$, $0\leq y<2$, and $x+y=2$. In some embodiments, the positive electrode includes $xLi_2MnO_3(1-x)LiMO_2$ is wherein $0\leq x<2$. In some embodiments, the cathode includes a cathode active material that is $LiMn_{0.5}Ni_{0.5}O_2$, $LiCoO_2$, $LiNiO_2$, $LiNi_{1-x}Co_yMn_zO_2$, or a combination of any two or more thereof. In some embodiments, the cathode includes a cathode active material that is $LiNi_\alpha Mn_\beta Co_\gamma O_2$, NMC111 ($LiNi_{0.33}Co_{0.33}Mn_{0.33}O_2$), NMC532 ($LiNi_{0.5}Co_{0.2}Mn_{0.3}O_2$), NMC622 ($LiNi_{0.6}Co_{0.2}Mn_{0.2}O_2$), NMC811 ($LiNi_{0.8}Co_{0.1}Mn_{0.1}O_2$) or a Ni-rich layer material such as $Li_{1+x'}Ni_hMn_kCo_lMe^2_{y'}O_{2-z'}F_{z'}$ where $0\leq h\leq 1$. In some embodiments, the cathode comprises $LiMn_{0.5}Ni_{0.5}O_2$, $LiCoO_2$, $LiNiO_2$, $LiNi_{1-x}Co_yMn_zO_2$, or a combination of any two or more thereof, wherein $0\leq x\leq 0.3$; $0\leq y\leq 0.5$; $0\leq z\leq 0.5$.

The term "spinel" refers to a manganese-based spinel such as, $Li_{1+x}Mn_{2-y}Me_zO_{4-h}A_k$, wherein Me is Al, Mg, Ti, B, Ga, Si, Ni, or Co; A is S or F; and wherein $0\leq x\leq 0.5$, $0\leq y\leq 0.5$, $0\leq z\leq 0.5$, $0\leq h\leq 0.5$, and $0\leq k\leq 0.5$.

The term "olivine" refers to an iron-based olivine such as, $LiFe_{1-x}Me_yPO_{4-h}A_k$, wherein Me is Al, Mg, Ti, B, Ga, Si, Ni, or Co; A is S or F; and wherein $0\leq x\leq 0.5$, $0\leq y\leq 0.5$, $0\leq h\leq 0.5$, and $0\leq k\leq 0.5$.

The cathode may be further stabilized by surface coating the active particles with a material that can neutralize acid or otherwise lessen or prevent leaching of the transition metal ions. Hence, the cathodes may also include a surface coating of a metal oxide or fluoride such as $ZrO_2$, $TiO_2$, $ZnO_2$, $WO_3$, $Al_2O_3$, MgO, $SiO_2$, $SnO_2$, $A_1PO_4$, $Al(OH)_3$, $AlF_3$, $ZnF_2$, $MgF_2$, $TiF_4$, $ZrF_4$, a mixture of any two or more thereof, of any other suitable metal oxide or fluoride. The coating can be applied to a carbon-coated cathode. The cathode may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

The electrodes of the electrochemical cells (i.e. the lithium batteries) may also include a current collector. Current collectors for either the anode or the cathode may include those of copper, stainless steel, titanium, tantalum, platinum, gold, aluminum, nickel, cobalt, cobalt nickel alloy, highly alloyed ferritic stainless steel containing molybdenum and chromium; or nickel-, chromium-, or molybdenum containing alloys.

The electrodes (i.e., the cathode and/or the anode) may also include a conductive polymer as a binder. Illustrative conductive polymers include, but not limited to, polyaniline, polypyrrole, poly(pyrrole-co-aniline), polyphenylene, polythiophene, polyacetylene, polysiloxane, polyvinylidene difluoride, or polyfluorene.

The electrochemical cells disclosed herein also includes a porous separator to separate the cathode from the anode and prevent, or at least minimize, short-circuiting in the device. The separator may be a polymer or ceramic or mixed separator. The separator may include, but is not limited to, polypropylene (PP), polyethylene (PE), trilayer (PP/PE/PP), or polymer films that may optionally be coated with alumina-based ceramic particles.

Any of the electrochemical cells described herein may be lithium secondary batteries. In some embodiments, the electrochemical cells may be a lithium-air battery.

The present invention, thus generally described, will be understood more readily by reference to the following examples, which are provided by way of illustration and are not intended to be limiting of the present invention.

EXAMPLES

Example 1

A Li||Li symmetric cells were assembled with lithium metal as both counter and reference electrode in an argon atmosphere glovebox (<1 ppm of $O_2$ and $H_2O$). Different cells contained different electrolytes. Cell A contained an electrolyte of 1.2 M lithium hexafluorophosphate ($LiPF_6$) in 3:7 (wt/wt) ratio of ethylene carbonate to ethylmethyl carbonate. Cell B contained an electrolyte of LiFSI dissolved in dimethyl dicarbonate (DMDC) at a molar ratio of 4:5, and 33 vol. % fluorinated ether (TTE). For clarity, the structures of the dimethyl dicarbonate (DMDC) and fluorinated ether (TTE) are:

DMDC

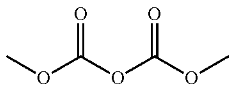

TTE

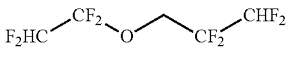

Example 2

Cycling of the cells prepared in Example 1. The cells prepared above in Example 1 were cycled at a current density of 2 $mAcm^{-2}$. As illustrated in FIG. 1, the charge/discharge voltage stabilized within ±0.1 V for Cell B, while the charge/discharge voltages for Cell A was large (>±1.5 V) and highly fluctuating. These results show that the electrolyte with the dicarbonate and fluorinated ether provides for more stable lithium plating and stripping, compared to the conventional electrolytes.

Example 3

Li||Li symmetric cells were prepared as in Example 1, but with (Cell C) an electrolyte of LiFSI dissolved in DMDC in a molar ratio of 2:3, and (Cell D) an electrolyte of LiFSI dissolved in DMDC in a molar ratio of 2:3 with further addition of 33 vol. % TTE.

Example 4

Figure 2:
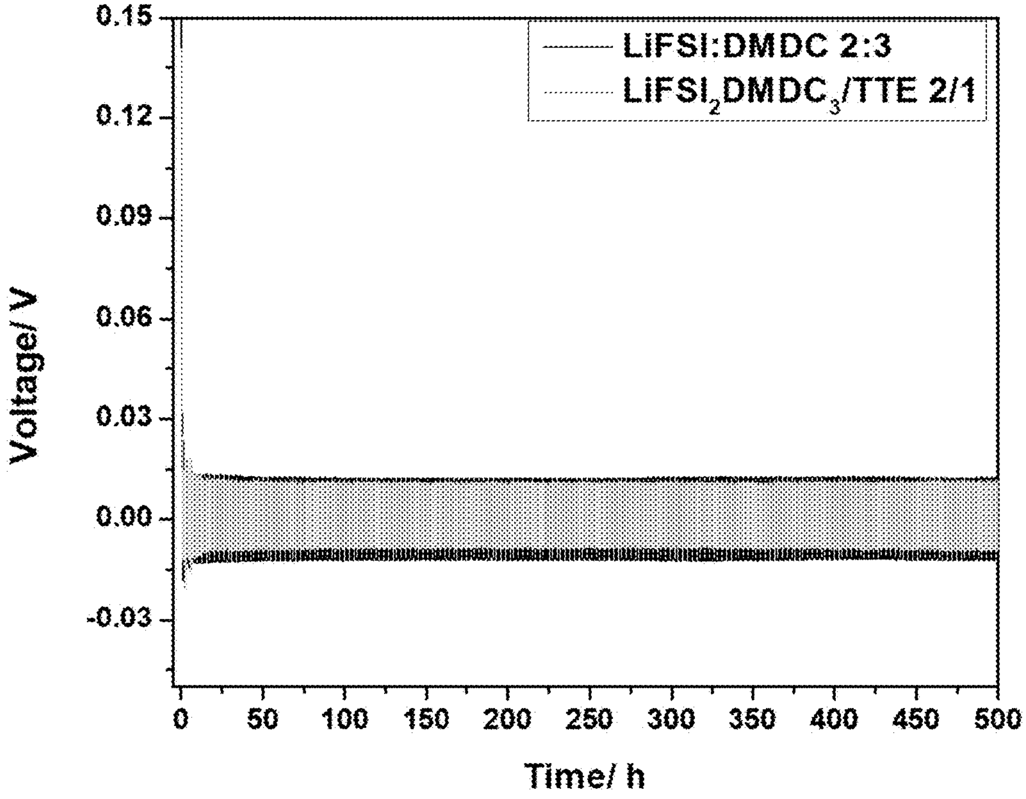
FIG. 2 is a graph of cycling performance of Li||Li symmetric cells using solely dicarbonyl and dicarbonyl with fluorinated ether electrolytes, according to Example 4.

Cycling of the cells prepared in Example 3. The cells prepared above in Example 3 were cycled at a current density of 2 $mAcm^2$. As illustrated in FIG. 2 a graph of cycling performance is provided for the cells using the different electrolytes. The cycling performance of both cells were highly stable with charge/discharge voltage stabilized within ±0.02 V after 10 cycles, and the cell using dicarbonyl solvent with fluorinated ether showed even lower polarization, demonstrating the synergistic effect of dicarbonyl solvent and fluorinated ether.

Example 5

Figure 3A:
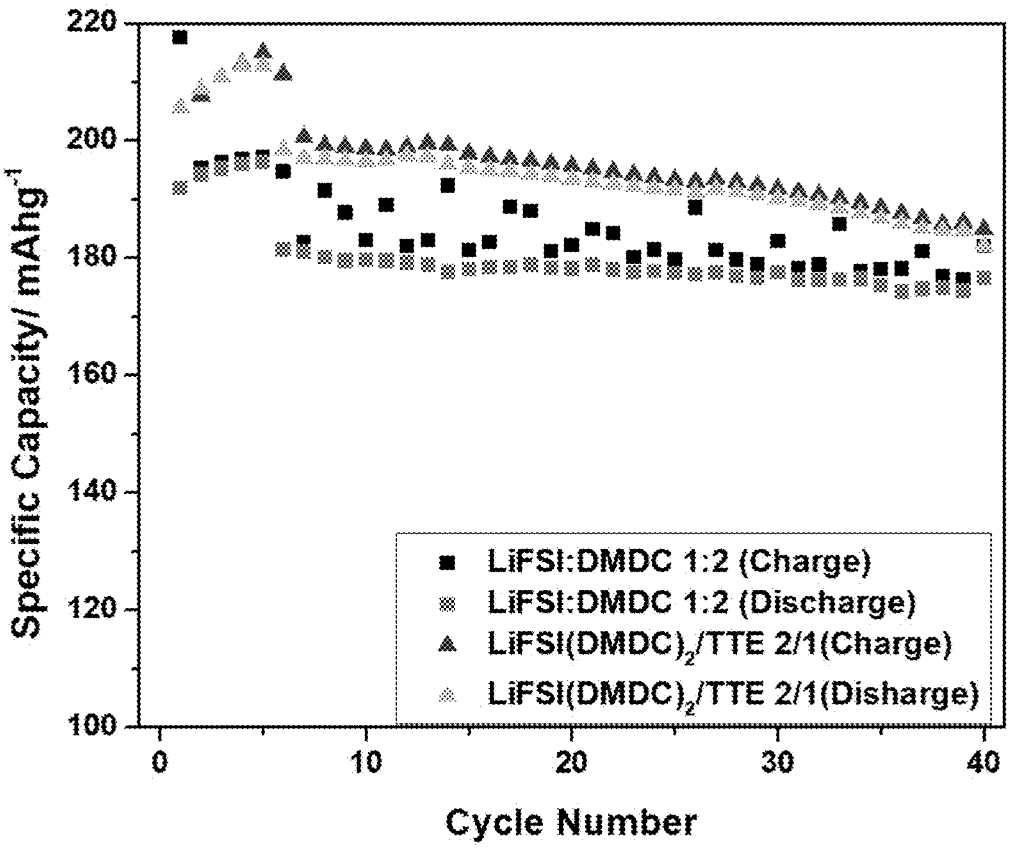
FIG. 3A and FIG. 3B are graphs of capacity retention of Li||$LiNi_{0.8}Mn_{0.1}Co_{0.1}O_2$ (NMC811) cell using solely dicarbonyl and dicarbonyl with fluorinated ether electrolytes cycling at 2.5V-4.3V, according to Example 5.
Figure 3B:
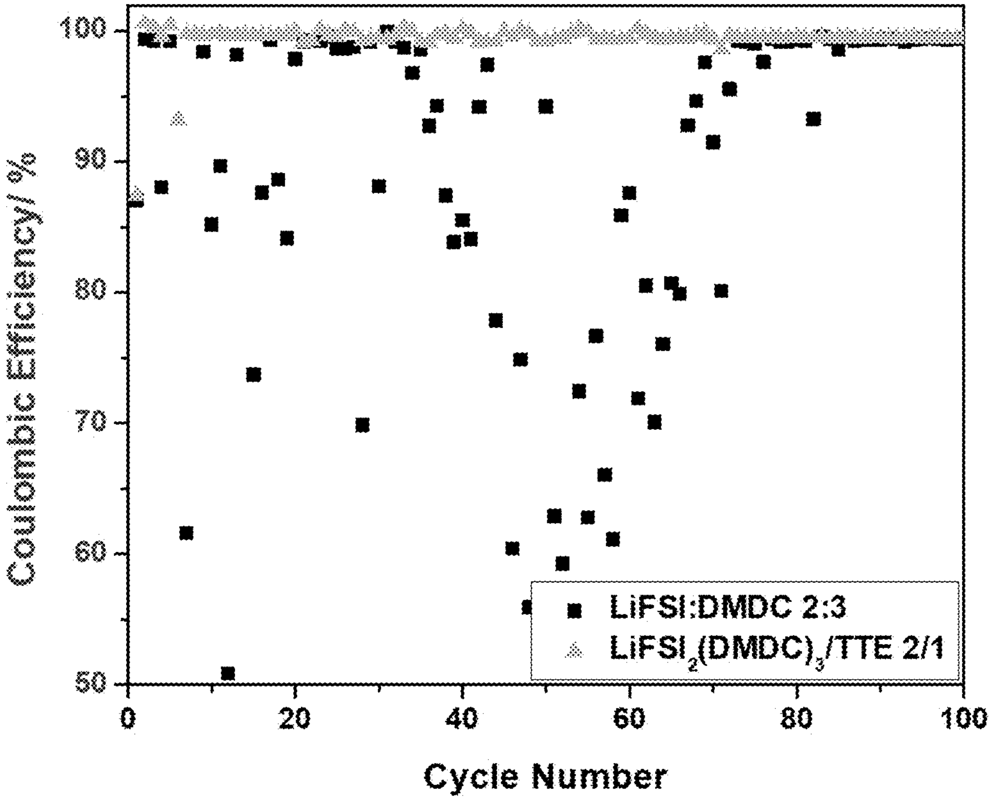

2032 coin cells of Li||NMC811 ($LiNi_{0.8}Mn_{0.1}Co_{0.1}O_2$) were prepared with an NMC811 positive electrode (1.93 mAh $cm^{-2}$ areal capacity), a Li metal foil anode, with a glass fiber separator, and an electrolyte (50 μL in each cell). The Li||NMC811 cells were prepared in an argon atmosphere glovebox (<1 ppm of $O_2$ and $H_2O$). The electrolytes included (Cell E) LiFSI dissolved in DMDC in a molar ratio of 1:2, and (Cell F) LiFSI dissolved in DMDC in a molar ratio of 1:2 with further addition of 50 vol. % TTE. The coin cells were the cycled between 2.5 V to 4.3 V. As depicted in FIG. 3, the cycling performance of the Li||NMC811 cells illustrates very large differences in the charge capacity and discharge capacity in Cell E, which is the dicarbonyl electrolyte without fluorinated ether, due to lithium dendrite formation. On the contrary, Cell F, having both dicarbonyl solvent DMDC and fluorinated ether TTE displayed significantly higher capacity and Coulombic efficiency. This result indicates the synergistic effect of lithium fluorosulfonylimide salt dissolved in dicarbonyl solvent and fluorinated ether.

Example 6

2032 coin cells of Li||NMC811 ($LiNi_{0.8}Mn_{0.1}Co_{0.1}O_2$) were prepared with an NMC811 positive electrode (1.93 mAh $cm^{-2}$ areal capacity), a Li metal foil anode, a glass fiber separator, and the prepared electrolyte (50 μL in each cell). The Li||NMC811 cells were prepared in an argon atmosphere glovebox (<1 ppm of $O_2$ and $H_2O$). The electrolytes included a conventional electrolyte (Gen2; 1.2 M lithium hexafluorophosphate ($LiPF_6$) in 3:7 (wt/wt) ratio of ethylene carbonate to ethylmethyl carbonate; Cell G); LiFSI dissolved in dimethyl carbonate (DMC) in a molar ratio of 2:5 with further addition of 50 vol. % TTE (Cell H); and LiFSI dissolved in dimethyl dicarbonate (DMDC) in a molar ratio of 4:5 with further addition of 50 vol. % fluorinated ether (TTE) (Cell I).

Figure 4:
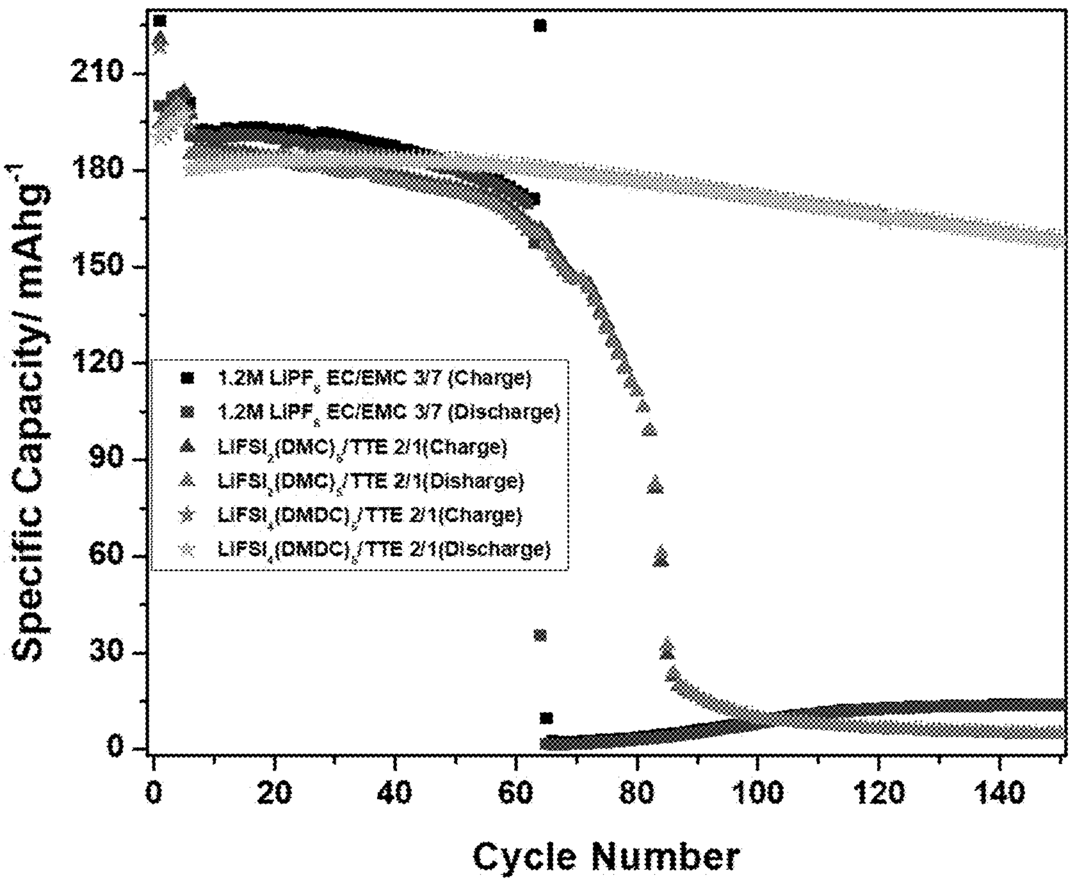
FIG. 4 is a graph of capacity retention of Li||$LiNi_{0.8}Mn_{0.1}Co_{0.1}O_2$ (NMC811) cell using baseline electrolyte, solely dicarbonyl and dicarbonyl with fluorinated ether electrolytes cycling at 2.5V-4.3V, according to Example 6.

The coin cells were cycled between 2.5 V to 4.3 V. As depicted in FIG. 4, the cycling performance of the Li||NMC811 cells illustrates that the capacity of Cell G decayed rapidly within 60 cycles due to lithium dendrite formation. Cell H, having the combination of monocarbonyl (DMC) and fluorinated ether electrolyte (F) displayed a slightly better performance Cell G, however, failure was evident after 80 cycles due to lithium dendrite formation. Cell I, however, employing both dicarbonyl solvent and fluorinated ether displayed exceptional capacity retention and Coulombic efficiency. This result clearly indicates the synergistic effect of lithium fluorosulfonylimide salt dissolved in dicarbonyl solvent and fluorinated ether.

Example 7

Figure 5A:
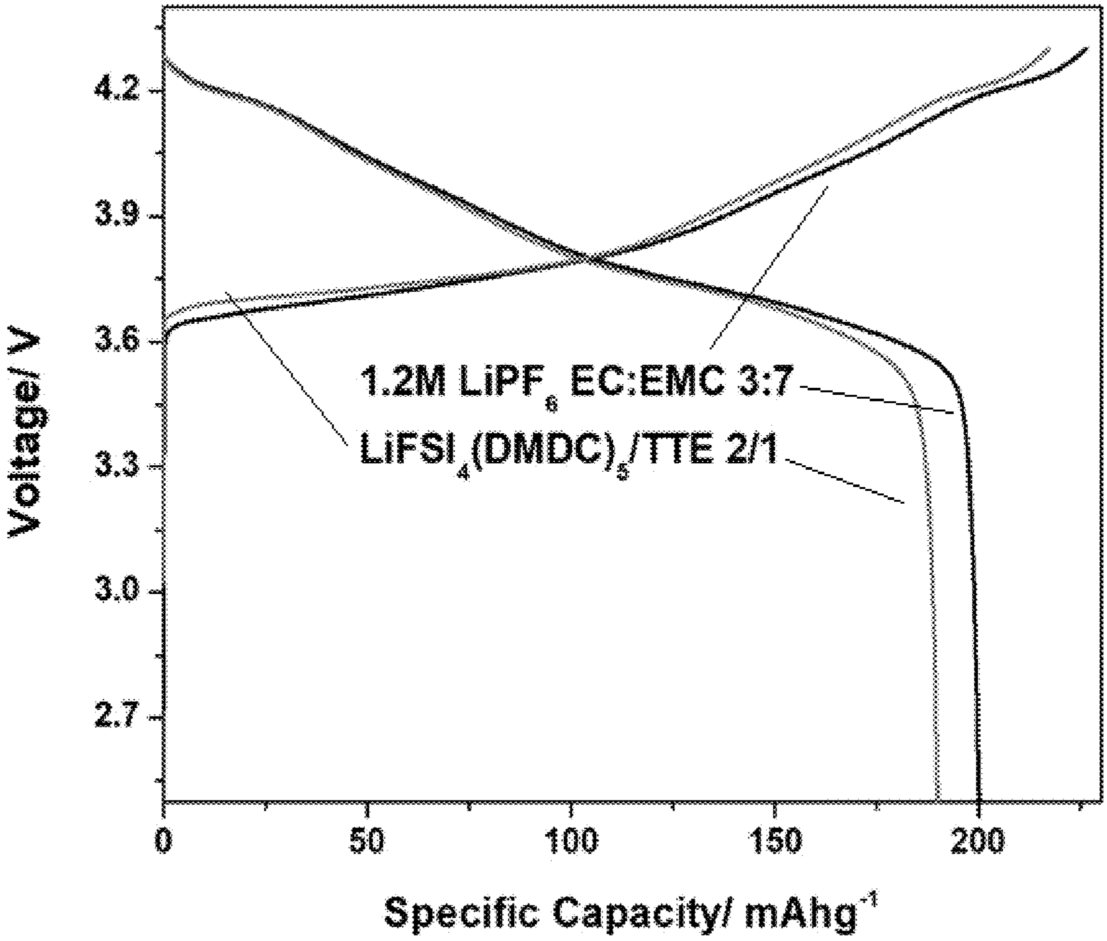
FIG. 5A, FIG. 5B and FIG. 5C represent, respectively, the $1^{st}$-cycle, $30^{th}$-cycle and $60^{th}$-cycle voltage profiles of Li||$LiNi_{0.8}Mn_{0.1}Co_{0.1}O_2$ (NMC811) cell using different electrolytes cycling at 2.5V-4.3V, according to Example 7.
Figure 5B:
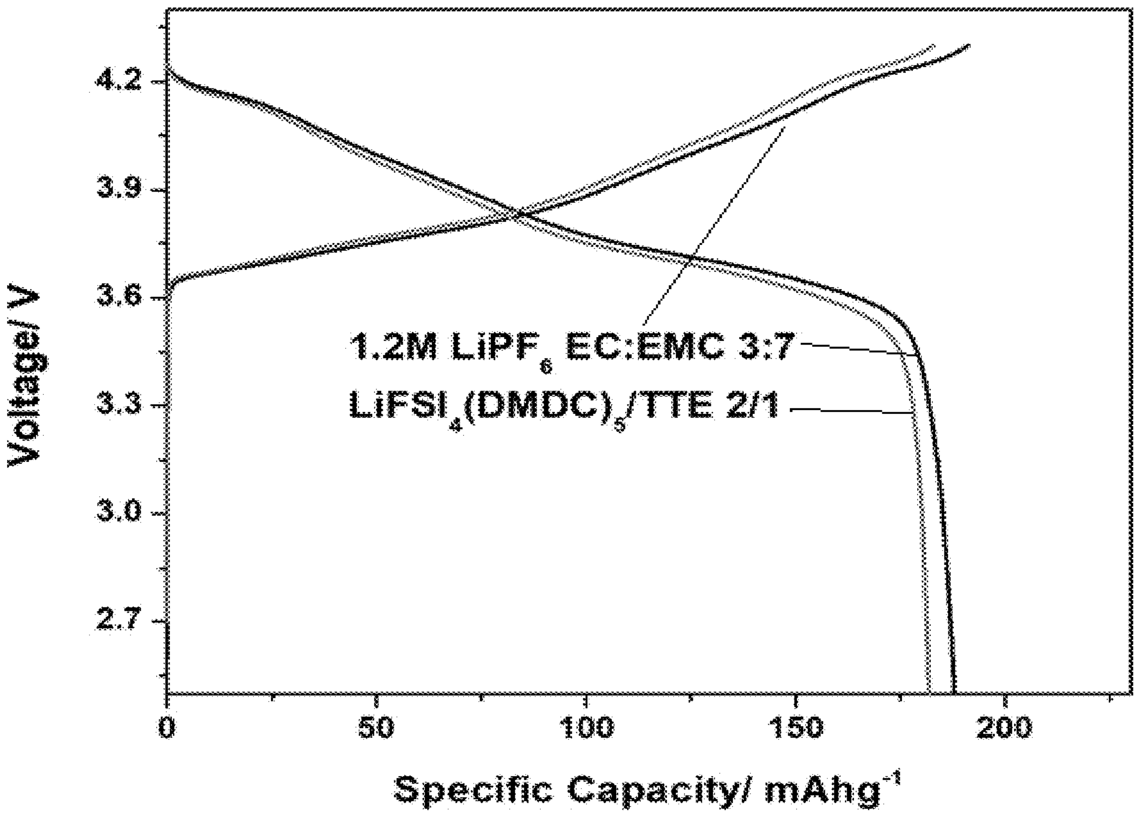
Figure 5C:
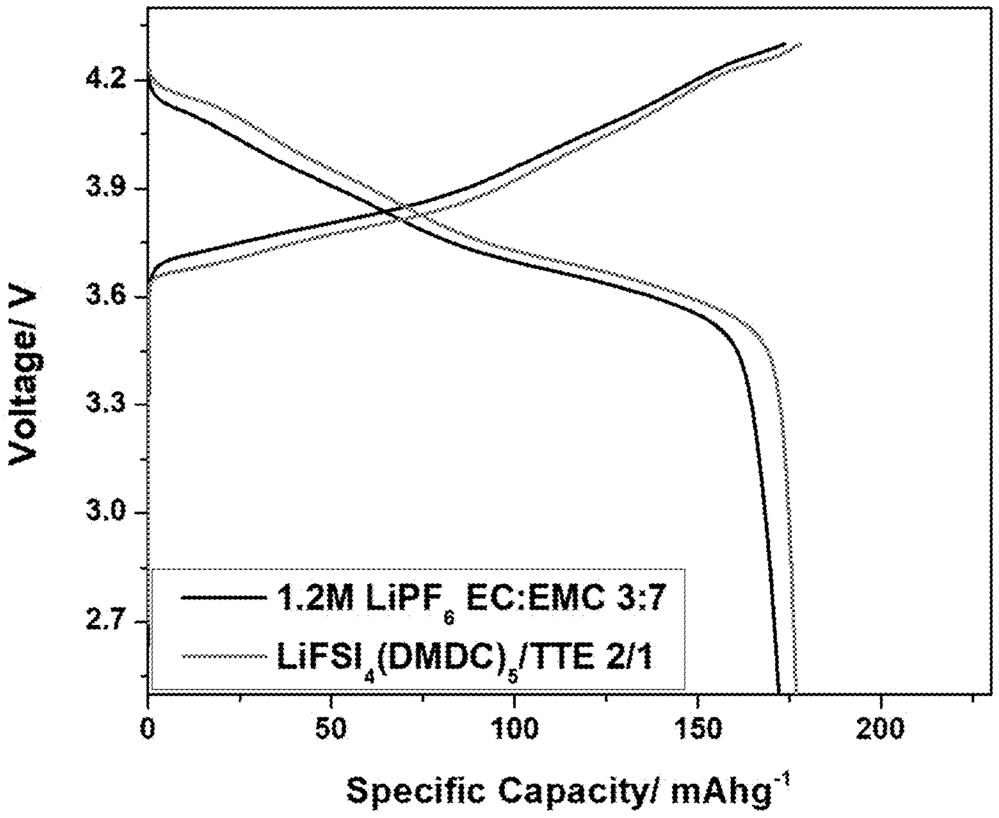

The $1^{st}$-cycle, $30^{th}$-cycle and $60^{th}$-cycle voltage profiles (FIGS. 5A, 5B, and 5C, respectively) of the 2032 coin cells of Li||NMC811 ($LiNi_{0.8}Mn_{0.1}Co_{0.1}O_2$) in Example 6 are shown for Cells G and I. Both Cell G and Cell I displayed similar polarization at the first cycle; however, a significantly smaller polarization was observed for Cell I after 60 cycles, demonstrating the strong synergistic effect of electrolyte using dicarbonyl solvent and fluorinated ether.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:

a cathode comprising a cathode active material;

an anode comprising lithium metal;

a separator; and an electrolyte comprising $LiN(SO_2F)_2$, a dicarbonyl solvent, and a fluorinated ether solvent, wherein the dicarbonyl solvent and the fluorinated ether solvent are presented in a volume ratio from 4:1 to 1:4 and wherein the dicarbonyl solvent is dimethyldicarbonate; diethyl dicarbonate; acetylacetone; ethyl acetoacetate; di-tert-butyl dicarbonate; 3,3-dimethyl-2,4-pentanedione; 2,2,6,6-tetramethyl-3,5-heptanedione; or 1,1,1-trifluoro-2,4-pentanedione.

2. The electrochemical cell of claim 1, wherein the fluorinated ether is a compound represented as Formula I or II:

(I)

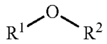

(II)

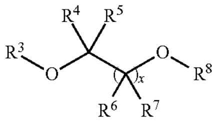

wherein:

in Formula (I):

$R^1$ and $R^2$ may be individually alkyl, $R^{20}$O-alkyl-, alkenyl, alkynyl, aryl, aralkyl, heteroaryl, heteroarylalkyl, heterocyclylalkyl, heterocyclylalkyl, cycloalkyl, cycloalkylalkyl; and $R^{20}$ is H, alkyl, cycloalkyl, cycloalkylalkyl, alkenyl, alkynyl, aryl, aralkyl, heterocyclyl, heterocyclylalkyl, heteroaryl, heteroarylalkyl, or siloxy;

or where $R^1$ and $R^2$ may join together to form a cyclic compound incorporating an —O—S(O)$_2$—O— group; and with the proviso that at least one $R^1$ and $R^2$ is fluorinated; and in Formula (II):

$R^3$, $R^4$, $R^5$, $R^6$, $R^7$, and $R^8$ may individually be H, alkyl, $R^{20}$O-alkyl-, alkenyl, alkynyl, aryl, aralkyl, heteroaryl, heteroarylalkyl, heterocyclylalkyl, heterocyclylalkyl, cycloalkyl, cycloalkylalkyl, or silyl; and $R^{20}$ is H, alkyl, cycloalkyl, cycloalkylalkyl, alkenyl, alkynyl, aryl, aralkyl, heterocyclyl, heterocyclylalkyl, heteroaryl, heteroarylalkyl, or siloxy;

or where two of $R^3$, $R^4$, $R^5$, $R^6$, $R^7$, and $R^8$ may join together to form a cyclic compound incorporating an —O—$S(O)_2$—O— group;

with the proviso that at least one $R^3$ and $R^8$ is fluorinated.

3. The electrochemical cell of claim 2, wherein the fluorinated ether is a compound represented as Formula I or II:

$R^1$ and $R^2$ are non-fluorinated alkyl or fluorinated alkyl;

$R^3$ and $R^8$ are non-fluorinated alkyl or fluorinated alkyl;

$R^4$, $R^5$, $R^6$, and $R^7$ are individually H, nonfluorinated alkyl, or fluorinated alkyl; and x is 0, 1, 2, 3, or 4;

with the provisos that at least one of $R^1$ or $R^2$ is fluorinated alkyl; and at least one of $R^3$ and $R^8$ is fluorinated alkyl.

4. The electrochemical cell of claim 2, wherein $R^1$, $R^2$, $R^3$, and $R^8$ are individually —$CFH_2$; —$CF_2H$; —$CF_3$; —$CF_2CF_3$; —$CF_2CHF_2$; —$CF_2CH_3$; —$CF_2CH_2F$; —$CHFCF_3$; —$CHFCHF_2$; —$CHFCH_3$; —$CHFCH_2F$; —$CH_2CF_3$; —$CH_2CHF_2$; —$CH_2CH_2F$; —$CF(CF_3)_2$; —$CH(CF_3)_2$; —$CF_2CF_2CF_3$; —$CF_2CF_2CHF_2$; —$CF_2CF_2CH_3$; —$CF_2CF_2CH_2F$; —$CH_2CF_2CF_3$; —$CH_2CF_2CHF_2$; —$CH_2CF_2CH_3$; —$CH_2CF_2CH_2F$; —$CHFCF_2CF_3$; —$CHFCF_2CHF_2$; —$CHFCF_2CH_3$; —$CHFCF_2CH_2F$; —$CF_2CH_2CF_3$; —$CF_2CH_2CHF_2$; —$CF_2CH_2CH_3$; —$CF_2CH_2CH_2F$; —$CF_2CHFCF_3$; —$CF_2CHFCHF_2$; —$CF_2CHFCH_3$; —$CF_2CHFCH_2F$; —$CHFCHFCF_3$; —$CHFCHFCHF_2$; —$CHFCHFCH_3$; —$CHFCHFCH_2F$; —$CH_2CH_2CF_3$; —$CH_2CH_2CHF_2$; —$CH_2CH_2CH_2F$; —$CF_2CF_2CF_2CF_3$; —$CF_2CF_2CF_2CH_3$; —$CF_2CF_2CF_2CHF_2$; —$CF_2CF_2CF_2CH_2F$; —$CH_2CF_2CF_2CF_3$; —$CH_2CF_2CF_2CH_3$; —$CH_2CF_2CF_2CHF_2$; —$CH_2CF_2CF_2CH_2F$; —$CHFCF_2CF_2CF_3$; —$CHFCF_2CF_2CH_3$; —$CHFCF_2CF_2CHF_2$; —$CHFCF_2CF_2CH_2F$; —$CF_2CH_2CF_2CF_3$; —$CF_2CH_2CF_2CH_3$; —$CF_2CH_2CF_2CHF_2$; —$CF_2CH_2CF_2CH_2F$; —$CF_2CHFCF_2CF_3$; —$CF_2CHFCF_2CH_3$; —$CF_2CHFCF_2CHF_2$; —$CF_2CHFCF_2CH_2F$; —$CHFCHFCF_2CF_3$; —$CHFCHFCF_2CH_3$; —$CHFCHFCF_2CHF_2$; —$CHFCHFCF_2CH_2F$; —$CH_2CH_2CF_2CF_3$; —$CH_2CH_2CF_2CH_3$; —$CH_2CH_2CF_2CHF_2$; —$CH_2CH_2CF_2CH_2F$; —$CF_2CF_2CF_2CF_2CF_3$; —$CH_2CF_2CF_2CF_2CF_3$; —$CF_2CF_2CF_2$ $CF_2CHF_2$; —$CH_2CF_2CF_2CF_2CHF_2$; —$CF_2OCFH_2$; —$CF_2OCF_2H$; —$CF_2OCF_3$; —$CF_2OCF_2CF_3$; —$CF_2OCF_2CHF_2$; —$CF_2OCF_2CH_3$; —$CF_2OCF_2CH_2F$; —$CF_2OCHFCF_3$; —$CF_2OCHFCHF_2$; —$CF_2OCHFCH_3$; —$CF_2OCHFCH_2F$; —$CF_2OCH_2CF_3$; —$CF_2OCH_2CHF_2$; —$CF_2OCH_2CH_2F$; —$CH_2OCFH_2$; —$CH_2OCF_2H$; —$CH_2OCF_3$; —$CH_2OCF_2CF_3$; —$CH_2OCF_2CHF_2$; —$CH_2OCF_2CH_3$; —$CH_2OCF_2CH_2F$; —$CH_2OCHFCF_3$; —$CH_2OCHFCHF_2$; —$CH_2OCHFCH_3$; —$CH_2OCHFCH_2F$; —$CH_2OCH_2CF_3$; —$CH_2OCH_2CHF_2$; —$CH_2OCH_2CH_2F$; —$CHFOCFH_2$; —$CHFOCF_2H$; —$CHFOCF_3$; —$CHFOCF_2CF_3$; —$CHFOCF_2CHF_2$; —$CHFOCF_2CH_3$; —$CHFOCF_2CH_2F$; —$CHFOCHFCF_3$; —$CHFOCHFCHF_2$; —$CHFOCHFCH_3$; —$CHFOCHFCH_2F$; —$CHFOCH_2CF_3$; —$CHFOCH_2CHF_2$; or —$CHFOCH_2CH_2F$.

5. The electrochemical cell of claim 2, wherein $R^3$, $R^4$, $R^5$, and $R^6$ are individually H, $C_1$-$C_8$-nonfluorinated alkyl, or $C_1$-$C_8$ fluoroalkyl.

6. The electrochemical cell of claim 1, wherein the fluorinated ether is 1,1,2,2-tetrafluoro-3-(1,1,2,2-tetrafluoroethoxy)propane; 2,2,3,3-tetrafluoro-1,4-dimethoxybutane; bis(2,2,2-trifluoroethyl) ether; 1,1,2,2-tetrafluoroethyl-2,2,2-trifluoroethyl ether; 1,1,2,3,3,3-hexafluoropropyl 2,2,2-trifluoroethyl ether; 1,1,2,2-tetrafluoroethyl-1H,1H,5H-octafluoropentyl ether; 1,2-(1,1,2,2-tetrafluoroethoxy)ethane; 1,3-(1,1,2,2-tetrafluoroethoxy)propane, or a mixture of any two or more thereof.

7. The electrochemical cell of claim 2, wherein the dicarbonyl compound is dimethyldicarbonate; diethyl dicarbonate; or di-tert-butyl dicarbonate.

8. The electrochemical cell of claim 1 further comprising an electrolyte stabilizing additive comprising $LiBF_2(C_2O_4)$, $LiB(C_2O_4)_2$, $LiPF_2(C_2O_4)_2$, $LiPF_4(C_2O_4)$, $Li_2(B_{12}X_{12-i}H_i)$; $Li_2(B_{10}X_{10-i'}H_{i'})$;

or a mixture of any two or more thereof;

wherein X is independently at each occurrence a halogen, i is an integer from 0 to 12 and i' is an integer from 0 to 10.

9. The electrochemical cell of claim 1, wherein the electrolyte further comprises an aprotic gel polymer.

10. The electrochemical cell of claim 1 which is a lithium secondary battery.

11. The electrochemical cell of claim 10, wherein the secondary battery is a lithium battery or a lithium-air battery.

12. The electrochemical cell of claim 1, wherein the cathode active material comprises a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1+x'}Ni_hMn_kCo_lMe^2_{y'}O_{2-z'}F_{z'}$, $VO_2$ or $E_{x''}F_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0 \le x \le 0.3$; $0 \le y \le 0.5$; $0 \le z \le 0.5$; $0 \le m \le 2$; $0 \le n \le 2$; $0 \le x' \le 0.4$; $0 \le \alpha \le 1$; $0 \le \beta \le 1$; $0 \le \gamma \le 1$; $0 \le h \le 1$; $0 \le k \le 1$; $0 \le l \le 1$; $0 \le y' \le 0.4$; $0 \le z' \le 0.4$; and $0 \le x'' \le 3$; with the proviso that at least one of h, k and l is greater than 0.

13. The electrochemical cell of claim 1, wherein the dicarbonyl solvent comprises dimethyl dicarbonate, the fluorinated ether solvent comprises $F_2HCCF_2OCH_2CF_2CHF_2$, and the dicarbonyl solvent and the fluorinated ether solvent are present at about 2:1 volume ratio and wherein the $LiN(SO_2F)_2$ is present in the electrolyte at a molar ratio of about 4:5 with the dicarbonyl solvent.

14. The electrochemical cell of claim 1, wherein the dicarbonyl solvent is dimethyldicarbonate or diethyl dicarbonate and the fluorinated ether is 1,1,2,2-tetrafluoro-3-(1,1,2,2-tetrafluoroethoxy)propane.

* * * * *